Patented Aug. 17, 1926.

1,596,769

UNITED STATES PATENT OFFICE.

WERNER SCHULEMANN, OF VOHWINKEL, AND KURT MEISENBURG, OF ELBERFELD, GERMANY, ASSIGNORS TO WINTHROP CHEMICAL COMPANY, INC., OF NEW YORK, N. Y.

PHARMACEUTICAL PRODUCT.

No Drawing.     Application filed May 15, 1925.  Serial No. 30,620.

This invention relates to the manufacture of a new pharmaceutical product, being a double compound of $\Delta$ -1.2-cyclohexenyl-ethyl-barbituric acid having the formula

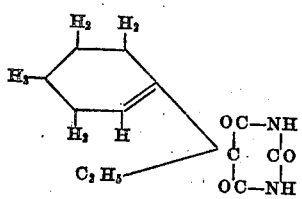

and 1-phenyl-2.3-dimethyl-4-dimethyl-amino-5-pyrazolon having the formula

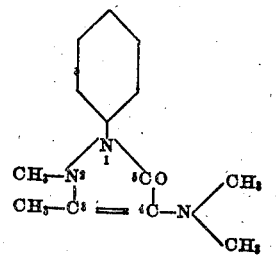

The new compound is a whitish crystallized product soluble in alcohol. It has proved to be a valuable hypnotic and analgetic; an average single dose being about 1/2 gram.

It is produced by allowing the above mentioned components to react on each other either in solution or by melting them together.

For instance we proceed as follows:

236 parts by weight of $\Delta$ -1.2-cyclohexenylethyl-barbituric acid are dissolved in ether and an ethereal solution of 4-dimethylamino-1-phenyl-2.3-dimethyl-5-pyrazolon is added thereto. By concentrating the mixture the new complex compound separates. It crystallizes from benzene in the shape of prisms melting at 134–135° C.

We claim:—

The herein described compound consisting of $\Delta$ -1.2-cyclohexenylethylbarbituric acid and 4-dimethylamino-1-phenyl-2.3-dimethyl-5-pyrazolon, the compound having a whitish coloration soluble in alcohol, melting at 134–135° C. having strong analgetic and soporific properties, substantially as described.

In testimony whereof we have hereunto set our hands.

WERNER SCHULEMANN.
KURT MEISENBURG.